INVENTORS
JOSEPH D. PRIDE, JR.
WILLIAM E. ZORUMSKI

BY
ATTORNEYS

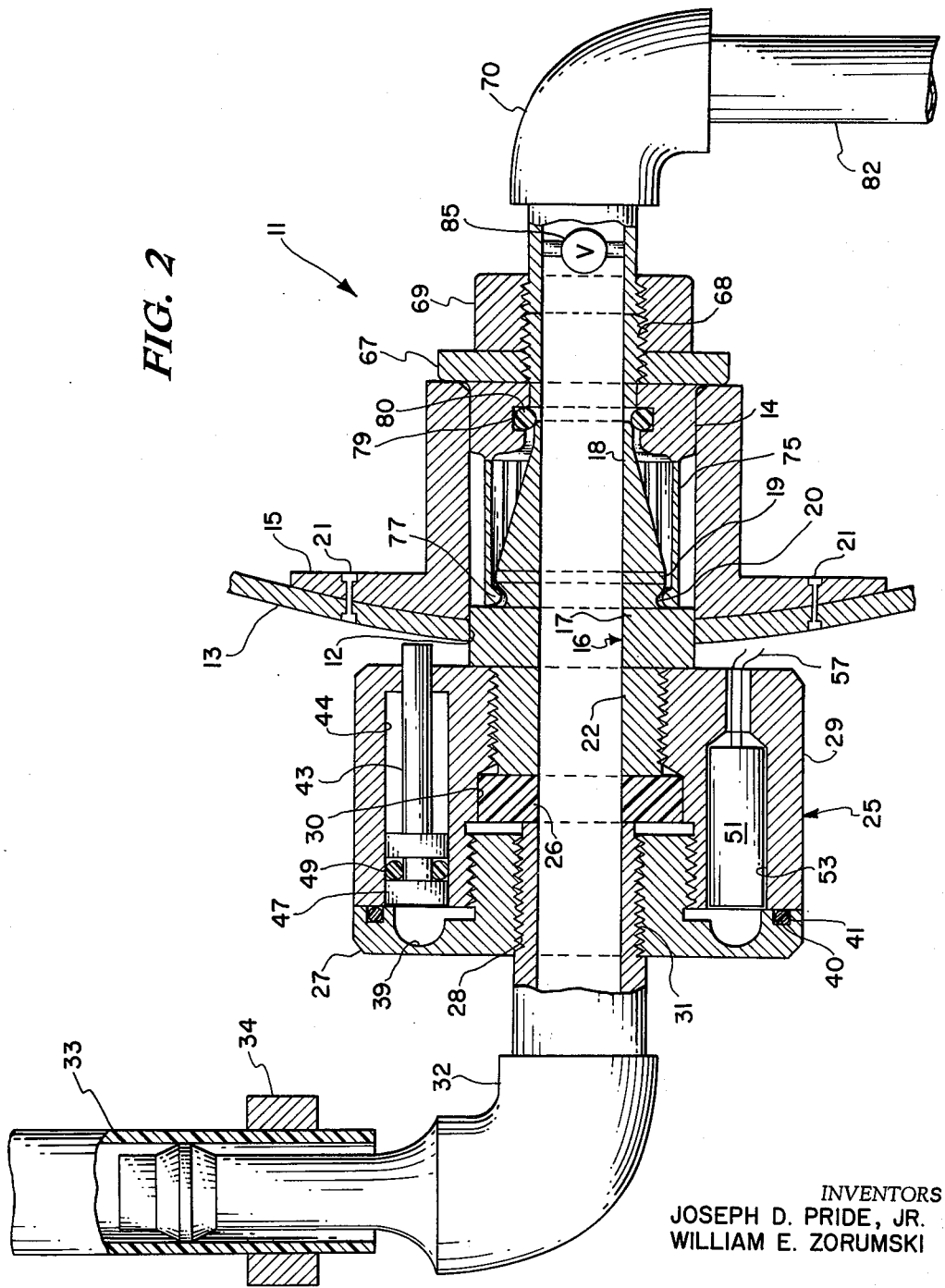

May 3, 1966   J. D. PRIDE, JR., ETAL   3,249,013
REMOTE CONTROLLED TUBULAR DISCONNECT
Filed April 3, 1964   3 Sheets-Sheet 3
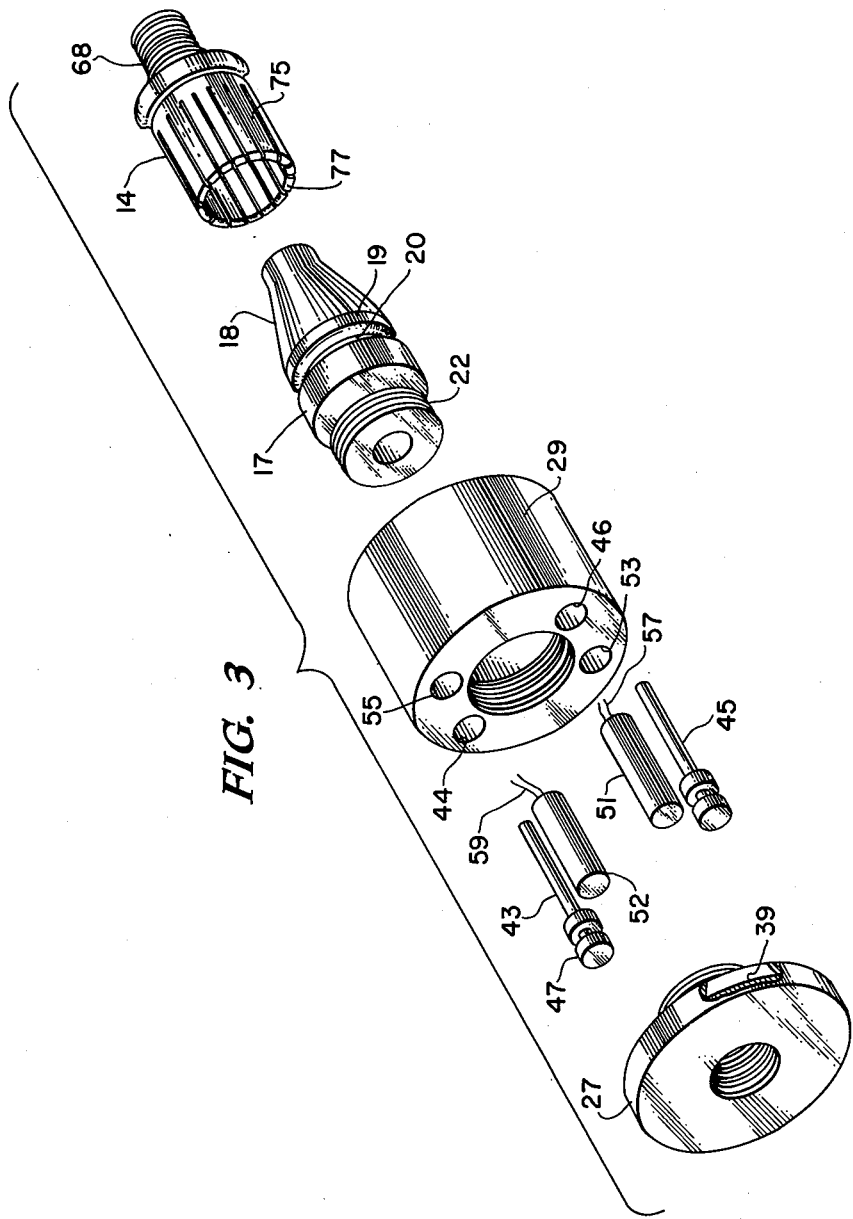
INVENTORS
JOSEPH D. PRIDE, JR.
WILLIAM E. ZORUMSKI
BY
ATTORNEYS United States Patent Office 3,249,013
Patented May 3, 1966

3,249,013
REMOTE CONTROLLED TUBULAR DISCONNECT
Joseph D. Pride, Jr., Poquoson, and William E. Zorumski, Hampton, Va., assignors to the United States of America as represented by the Administrator of the National Aeronautics and Space Administration
Filed Apr. 3, 1964, Ser. No. 357,336
3 Claims. (Cl. 89—1.7)

The invention described herein may be manufactured and used by or for the Government of the United States of America for governmental purposes without the payment of any royalties thereon or therefor.

This invention relates to a connect and quick disconnect mechanism and relates with particularity to a remotely actuated quick disconnect for tubular umbilical conduits employed to transfer a flowable medium from a ground source to a rocket propelled vehicle which is loaded and ready for launching.

Pneumatic lines and other tubular umbilical conduits are used regularly to transfer various flowable media to vehicles on the launch pad at launch site. Most presently known remote control disconnect systems for these tubular conduits employ the use of, either hydraulic operated cable and pulley arrangements or, a lanyard-type "pull" to effect removal of the line or conduit from the rocket vehicle prior to launch. Another previously used system involves the hand disconnection of a valve and manual removal of the conduit adjacent the vehicle receiving the flowable medium. Due to bulky structure, and occasionally unreliable results obtained by the complex hydraulic system, and the danger to individuals from armed rocket motors on the launcher in hand operated disconnects, there is an urgent need in the art for a reliable remotely controlled umbilical disconnect for conduits employed to transfer flowable media to vehicles on the launch pad. A very reliable remotely controlled explosive actuated disconnect has been developed for use with electrical transmission lines leading to loaded vehicles on the launch pad. This electrical disconnect assembly is the subject matter of copending application NASA Case 711, Serial No. 357,334 filed April 3, 1964 by Russell E. Clickner, Jr., and of common assignment. The present invention of a remote controlled disconnect for tubular conduits was developed as an improvement of the electrical disconnect system disclosed in the copending application to enable vehicles requiring flowable media to be remotely disconnected from the conduits while in their launch position.

It is therefore an object of the present invention to provide a new and novel remote controlled umbilical disconnect system for use with tubular lines.

Another object of the present invention is the provision of a remotely actuated disconnect mechanism for removing an umbilical tubular medium conduit from a rocket propelled vehicle prior to launch thereof.

Yet another object of the present invention is a new and novel system for remotely disconnecting tubular conduits.

An additional object of the present invention is the provision of a remotely actuated mechanism for terminating the flow of flowable medium to a rocket vehicle prior to launch thereof.

According to this invention, the foregoing and other objects are obtained by providing a remotely actuated explosive disconnect assembly for a tubular umbilical conduit that is employed to transfer a flowable medium from a remote ground station medium source to a movable vehicle such as, for example, a rocket propelled vehicle being readied for launch at the launch site. The disconnect assembly of the present assembly is attached to the terminal end of an umbilical conduit, and includes a male connective element thereon. This male element is provided with an open tubular protuberance adapted to be slidably positioned within a utilization port in the side of the vehicle. This tubular protuberance is of tapered configuration with an enlarged base and a reduced tip portion and has a circumferential groove formed at the base adjacent the main body portion of the male element. When positioned through the utilization port in the vehicle sidewall, the tubular protuberance enters a female receptacle for frictional connection therewith. The female receptacle is in operative adjacency with the vehicle utilization port, and includes a tubular bore for receiving the protuberance from the male element. This tubular bore is serrated, with each serration thereof being provided with an enlarged inwardly directed lip. Thus, when the male element protuberance is received by the female bore, a plurality of lips are spring-urged into the protuberance circumferential groove for retaining the parts connected. The base end of the female receptacle connects with a suitable transfer conduit leading to the vehicle utilization station adapted for receiving flowable medium through the system.

The remaining parts of the system are essentially like that disclosed in the referred to copending application. A circumferential sleeve is secured in conventional manner about the male element adjacent the protuberance base. A pair of diametrically opposed explosively driven pistons are provided in this sleeve and are adapted to push against the vehicle sidewall when propelled by the gaseous forces generated by remote signal actuation of an explosive charge. This pushing movement creates a tension load sufficient to remove the male element from its frictional engagement with the lips in the female receptacle bore and propel the male disconnect assembly and the attached umbilical conduit outwardly from the vehicle.

A more complete appreciation of the invention and many of the attendant advantages thereof will be more readily apparent as the same becomes better understood by reference to the following detailed description when considered in connection with the accompanying drawings wherein:

FIG. 2 is a sectional view of the connect and disconnect assembly; and,

FIG. 3 is an exploded view of major parts of the connect and disconnect assembly of the present invention.

Figure 1:
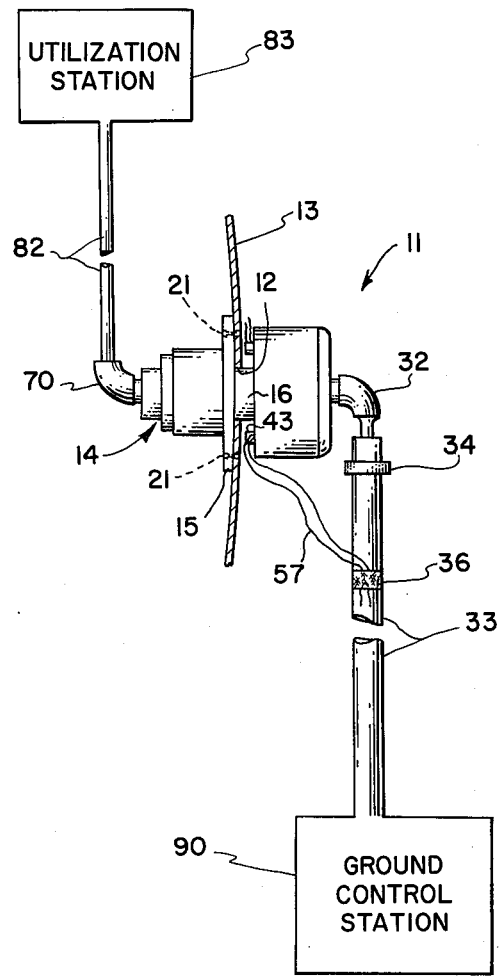
FIG. 1 is a somewhat schematic representation of the remotely controlled disconnect of the present invention in operative connection with a tubular umbilical conduit leading from a ground control flowable medium source to a vehicle.

Referring now to the drawing and more particularly to FIG. 1, there is shown a media transfer system employing an umbilical conduit connect and disconnect assembly, generally designated by reference numeral 11. One end of assembly 11 constitutes a tubular protuberance 16 adapted to be inserted through a port 12 in the sidewall of vehicle 13. The other end of assembly 11 connects with a hose connection nipple 32 at the terminal end of tubular conduit 33. Conduit 33 leads to a remote ground control station 90, as will be further explained hereinafter.

A female receptacle 14 is secured internally of vehicle 13 by conventional structure, such as, for example, bracket 15 and rivets 21, and adapted to receive a portion of protuberance 16. A suitable utilization station 83 is disposed within vehicle 13 for receiving the flowable medium from ground control station 90. Communication between receptacle 14 and utilization station 83 is provided by way of tubular transfer hose 82 and hose fitting 70.

Referring now more specifically to FIG. 2, tubular protuberance 16 includes a boss 17 intermediate an integrally formed reduced diameter tip 18 and an externally threaded shaft connector 22. Tip 18 tapers from a circumferential shoulder 19 thereon toward its open end. Shoulder 19 is spaced from boss 17 with a circumferential indentation or groove 20 being formed therebetween.

A two-part circumferential sleeve 25 is positioned around and threadedly attached to shaft 22. Sleeve 25 consists of a centrally tapped cover or manifold 27 and a tubular base section 29. Base 29 and manifold 27 are threadedly connected at threads 31 and manifold 27 is threadedly connected at the tapped opening 28 thereof to a hose connection nipple 32. A sealing washer 26 formed of a substantially inert material, such for example Teflon, is slidably received by counterbore 30 in base 29 in position to permit shaft 22 and nipple 32 to bite into opposing surfaces thereof to prevent media leakage in the assembly.

Manifold 27 is provided with a substantially hemispherically shaped annular gaseous passageway 39 facing base 29. A conventional O-ring seal 40 is disposed within an annular cavity 41 adjacent passageway 39 so as to abut base 29 when the two members are attached and to provide a gaseous seal between these members. Base 29 is provided with a pair of diametrically opposed identical pistons 43 and 45 (FIG. 3) disposed, respectively, in cylinders 44 and 46. Cylinders 44 and 46 are in communication with gas passageway 39 (FIG. 2).

As shown more distinctly in FIG. 2, piston 43 includes an enlarged head portion 47 having a circumferentially reduced intermediate area thereon in which is disposed a sealing O-ring 49. Piston 45 is of identical construction and the details of which are not further described, in the interest of brevity. Also disposed in base or action member 29 is a pair of conventional diametrically opposed pyrotechnics or gas generating squibs, designated by reference numerals 51 and 52 (FIG. 3). Squibs 51 and 52 are positioned within a pair of oppositely disposed, identical bores 53 and 55 which are also in communication with gaseous passageway 39. Electrical lead wires 57 and 59 extend, respectively, through bores 53 and 55 to connect, respectively, with squibs 51 and 52. A conventional plotting compound, not illustrated, may be placed in bores 53 and 55 to seal sleeve 25 from outside moisture and other contaminants in a conventional manner.

Referring once again to FIG. 2, female receptacle 14 is slidably received by tubular bracket 15 which is circumferentially disposed around port 12 in vehicle 13. Bracket 15, as mentioned hereinbefore, is attached to vehicle 13 in fixed relationship thereto by a plurality of rivets 21, or other conventional attachment means. One end of female receptacle 14 extends aft of bracket 15 and is provided with a tubular external threaded shank 68. A collar 67 is threaded onto shank 68 to maintain female receptacle 14 securely fixed to bracket 61. A conventional slip-nut fitting 69 is also received by shank 68 of female receptacle 14 to attach hose fitting 71 thereto.

As shown more specifically in FIGS. 2 and 3 the forward end of female receptacle 14 is serrated to form a plurality of longitudinally extending circumferentially spaced fingers 75. Each finger 75 is provided at its terminal end with an internally directed lip 77 having a cross-sectional area of substantially the same size and configuration as circumferential groove 20 on protuberance 16. Each finger 75 acts as an independent leaf spring to force lips 77 into frictional engagement with groove 20 when tip 18 is received by receptacle 14. Tip 18 of protuberance 16 is also adapted to abut against an enlarged O-ring seal 80 disposed in an internal circumferential groove 79 formed substantially intermediate the ends of female receptacle 14.

Referring once against more specifically to FIG. 1, hose fitting 70 is connected to a tubular transfer conduit 82. Conduit 82 includes a conventional one-way valve 85 and leads to a flowable media utilization station 83 disposed at some point within vehicle 13. Utilization station 83 can be any of a variety of forms depending upon the type of flowable media adapted, in a given situation, to be passed into vehicle 13, as will be further explained hereinafter.

Hose connection nipple 32 is slidably received by the terminal end of a tubular conduit 33 and maintained therein by a conventional circumferential clamp 34. Conduit 33 is of flexible construction and leads to a remotely positioned ground control station 90. Lead wires 57 and 59 extend from disconnect assembly 11, along conduit 33 to connect with suitable conventional circuitry at ground control station 90. Wires 57 and 59 are maintained in substantially fixed relationship with conduit 33 by tape 36 or other conventional attachment mechanism. Ground control station 90 provides the signal or source of electrical energy, in a conventional manner, to selectively and remotely actuate squibs 51 and 52 when it is desired to remove assembly 11 and umbilical conduit 33 from vehicle 13. The source of flowable media adapted to be transmitted through conduit 33 to vehicle 13 is also located at the control station 90.

OPERATION

In operation of the presently described remotely controlled connect and disconnect assembly 11, the parts are disposed on vehicle 13 as shown in FIG. 1 with a manual force of, for example, approximately twenty pounds being required to insert protuberance 16 into receptacle 14. The construction of the serrated end of receptacle 14 provides a spring-groove clamping technique for maintaining protuberance 16 in fixed relationship with receptacle 14. That is, lips 77 on fingers 75 slide over shoulder 19 and spring into groove 20 to retain protuberance 16 in position. Adequate clearance is provided between bracket 15 and fingers 75 (FIG. 2) to permit the required spring movement thereof.

The system may be calibrated to release at any desirable axial force with one specific embodiment of the present invention, as described, requiring twenty pounds axial force or tension load, to overcome the spring force exerted in groove 20 by lips 77 of fingers 75.

Obviously, different structural force designs may be employed for specific units. The required connect and disconnect force in a particular situation may be varied by numerous techniques, such as, for example, reducing the size or changing the contour of lips 77, increasing the length of or otherwise reducing the spring force of fingers 75, reducing the number of fingers 75 employed and the like.

After attachment of assembly 11 to receptacle 14, a suitable valve or other conventional structure is actuated at control station 90, in a conventional manner, to induce medium flow through the system. When an adequate supply of the flowable media has been transferred to utilization station 83 within vehicle 13, the supply is shut off at the ground station, and the electrical circuitry at the ground station, not shown, is closed to generate a signal to actuate squibs 51 and 52. Upon this remote actuation of squibs 51 and 52, they ignite and expel their gaseous discharge into hemispherical annular gas passageway 39. Inasmuch as gas received in the passageway 39 will then exert pressure on piston head 47 of piston 43, and its identical counterpart 45, the pistons will then be forced against the sidewall of vehicle 13 and exert a pushing force thereagainst. This force, acting on diametrically opposed sides of sleeve 25, induces a tension load in the connection sufficient to push disconnect 11 and its attached umbilical tubular conduit 33 in a perpendicular direction away from vehicle 13 to break the spring-groove contact between groove 20 of protuberance 16 and fingers 75. Any excess axial forces exerted by pistons 43 and 45 serve to propel assembly 11 and umbilical tubular conduit 33 laterally away from vehicle 13 to thereby eliminate any possible entanglement with the fins or other aft vehicle structure at launch.

It is obvious from the description hereinbefore, the construction of gas passageway 39 is such that the use of a single gas generating squib 51 or 52, and a single piston, either 43 or 45, in conjunction with the squib arrangement, could provide adequate axial force or tension load needed to perform the disconnect function for removing assembly 11 from vehicle 13. The use of two squibs and two pistons is merely a double safety factor, as pointed out in the copending application referred to hereinbefore. Additionally, it is readily apparent that any number of squibs and pistons may be used in a given situation, when so desired, within the teachings of this invention.

Also, as in the referenced copending application, this invention is readily adaptable to be reloaded on-site in the event a "hold" order is given after removal of conduit 33 and subsequent reconnection of umbilical conduit to vehicle 13 prior to final countdown is needed. This reloading process is readily accomplished by threadedly removing assembly 11 from hose connection nipple 32 and then separating two-part sleeve 25 at the threaded connection 31 thereon to expose the piston and squib cavities. The pistons 43 and 45 are adapted to remain within sleeve 29 and may be reused with explosive squibs 51 and 52 being the only replacement parts required for arming the assembly at the end of each operation in which explosive separation of conduit 33 is made. Thus, when reloading, new squibs 51 and 52 are placed in bores 53 and 55 with the lead wires 57 and 59 being passed through the opposite end of the bores for connection to the electrical circuitry at the ground station. The reassembly of the device is merely a reverse procedure of the disassembly described, and disconnect element is again ready for positive connection with vehicle 13.

The major components of assembly 11, as illustrated in FIG. 3 are constructed, with precision, from stainless steel stock and are thus quite durable and damage resistant. This precision and durable construction permits reuse of the major components in the disconnect element numerous times before replacement or overhaul thereof is required.

It is thus seen from the above description that the present invention provides a positive and safe, remotely controlled, quick tubular conduit disconnect assembly, which is reliable in use and of simple, reusable construction. In addition to these advantages of the present invention, the disconnect assembly is relatively light in weight, provides more than adequate safety in loading and disconnecting thereof, and is of relatively low cost in comparison with prior known disconnect assemblies capable of being used with tubular conduit assemblies.

As mentioned hereinbefore, the present conduit disconnect assembly is adaptable for use with any type of flowing media that is to be transported from a remote ground station onboard a rocket propelled vehicle when in the ready position at the launch site. Accordingly, as used in the present application the term "flowable media" is intended to include air; liquids, such for example, water, hydraulic fluid, and various liquid fuels; and gases. Thus, inert gas, such for example nitrogen, may be transferred under pressure through conduit 33 to a utilization station 83 onboard vehicle 13. When employing the present invention to charge nitrogen bottles, utilization station 83 would be in the form of any number of nitrogen bottle containers to be used, for example, in the guidance system, or for other purposes onboard the vehicle 13.

When employing the present invention to transfer any flowable medium that is to be stowed for subsequent use during operational flight of vehicle 13, conventional one-way valves 85 are inserted at any desired point between receptacle 14 and utilization station 83 therein, as the situation and media will dictate. Similar valves, not shown, may also be employed adjacent assembly 11 in conduit 33, when so desired.

In one specific application of the present invention, it was necessary to transfer a refrigerated air supply to utilization station 83 in a vehicle 13. In this situation the utilization station was in the form of a closed loop circulation system adapted to maintain telemetry equipment within vehicle 13 at substantially constant temperature while vehicle 13 was standing on the launch site. Thus, on this particular occasion, the use of one-way valve 85, in line 82, was unnecessary and it was omitted inasmuch as the telemetry system was adapted to be subjected to the environmental conditions during the flight of vehicle 13 and cooling thereof was no longer necessary or desired.

The operational advantages and the adaptability of the herein described tubular conduit disconnect assembly will not be readily apparent, as will the obviousness of utilizing the herein described invention in any situation where it is feasible to employ a remotely actuated signal-responsive quick disconnect for a tubular conduit.

The invention has been described in connection with exemplary embodiments thereof, but it is to be understood that this embodiment is given by way of illustration only and not limitation. Accordingly, changes and modifications in the details of the apparatus can obviously be made by those skilled in the art without departing from the spirit or scope of the invention. For example, the present invention may be used on individual ones of a plurality of conduits leading to a particular vehicle 13 with the electrical circuitry at the ground station therefor being constructed to simultaneously, or sequentially, remove the various conduits, as so desired. In addition, although the specific embodiment illustrated has been described as being responsive to a twenty-pound axial force to effect removal thereof, where it is desirable to employ a more rugged conduit connection, the use of more powerful explosive gas-generating squibs and the use of additional pistons may be used as necessary in a given situation. By the same token, less powerful squibs may be used for connections requiring less than twenty pounds axial thrust for disconnect thereof.

In lieu of, or in addition to, the one-way valve 85, it is also apparent that conventional remotely actuated valves may be employed at any point in the flowable media system wherever desired.

Thus, it will be readily apparent to those skilled in the art that the present invention is readily adaptable for use in disconnecting any tubular conduit system capable of transferring a flowable media therethrough, without departing from the scope of the present invention. It is therefore to be understood that, within the scope of the appended claims, the invention may be practiced otherwise than as specifically described.

What is claimed as new and desired to be secured by Letters Patent of the United States is:

1. In combination, a rocket vehicle having a utilization port therein for receiving a flowable media while the vehicle is being readied for launch at a launch site, and tubular conduit means for transferring the flowable media from a remotely positioned ground station to said vehicle, the improvement therewith comprising:

a first coupling secured to the terminal end of said conduit and having a tubular protuberance thereon adapted to be at least partially received by said vehicle utilization port, a second coupling secured within said vehicle in circumferential relationship with said utilization port, and including a receptacle adapted to releasably connect with said tubular protuberance on said first coupling, said receptacle including a plurality of spring fingers for frictionally engaging selected portions of said protuberance, said spring fingers providing the sole retaining force for maintaining said protuberance in said receptacle and being so constructed and arranged as to quickly release the frictional engagement of said protuberance in response to a predetermined axial load being exerted on said protuberance, transfer means operationally secured to said second coupling for conveying the flowable media received within said vehicle to a vehicular station of use, and remotely controlled gaseous actuated means adjacent said first coupling for selectively contacting said vehicle and extracting said first coupling from said vehicle, said gaseous actuated means being disposed in circumferential relationship with said first coupling and serving to provide said predetermined axial load on said protuberance.

2. In combination with a fluid source and a fluid receiving station:

a flexible conduit leading from a remotely located fluid source to said station, a connect and disconnect assembly secured to the terminal end of said conduit, coupling means at said fluid receiving station for slidably receiving at least a portion of said connect and disconnect assembly, said assembly portion including a tubular protuberance having a base and a tip portion, a circumferential groove formed on said protuberance, said coupling means including a tubular receptacle for receiving at least a portion of said protuberance, said tubular receptacle including retention means for frictionally engaging said groove and serving as the sole means necessary to maintain said protuberance in said receptacle under predetermined tension load and adapted to release said protuberance when the tension load thereon exceeds a calculated minimum, and tension-producing means for tensionally removing said protuberance from said receptacle, said tension-producing means including:
(a) piston means carried by said assembly, and
(b) signal-responsive means for exerting a driving force on said piston means, said piston means being a pair of diametrically opposed parallel pistons and so constructed and arranged as to uniformly push against fixed structure, relative to said coupling means, to provide a tension load sufficient to remove the frictional engagement of said protuberance by said retention means and expel said assembly and the attached conduit a distance away from said station.

3. In combination with a flowable media source and a media receiving station:

a flexible conduit leading from a remotely located media source to said station, a remotely actuated connect and disconnect assembly secured to the terminal end of said conduit, coupling means at said media receiving station for releasably connecting with at least a portion of said connect and disconnect assembly, said assembly portion including a tubular protuberance, a circumferential groove formed on said protuberance, said coupling means including a plurality of circumferentially disposed spring-biased lips to frictionally engage said groove and provide the sole means necessary to maintain said protuberance in said receptacle under predetermined tension load and adapted to release said protuberance when the tension load thereon exceeds a calculated minimum, and actuable piston means circumferentially disposed about said tubular protuberance for exerting the necessary axial uniform tension load thereon to remove said protuberance from said coupling.

References Cited by the Examiner
UNITED STATES PATENTS

| | | | |
|---|---|---|---|
| 2,727,759 | 12/1955 | Elliott | 285—316 X |
| 2,784,987 | 3/1957 | Corcoran | 285—316 X |
| 2,962,934 | 12/1960 | Seidner | 89—1.7 |
| 3,024,703 | 3/1962 | Herold | 89—1.7 |
| 3,059,207 | 10/1962 | Baird | 89—1 X |
| 3,084,597 | 4/1963 | Beyer | 89—1 |
| 3,112,672 | 12/1963 | Webb | 89—1.7 |

BENJAMIN A. BORCHELT, *Primary Examiner.*

SAMUEL W. ENGLE, *Examiner.*

F. C. MATTERN, Jr., *Assistant Examiner.*